US007850130B2

(12) United States Patent
Bevirt et al.

(10) Patent No.: US 7,850,130 B2
(45) Date of Patent: Dec. 14, 2010

(54) SUPPORT ARM WITH REVERSED ELASTIC AND INELASTIC RANGES

(76) Inventors: Joeben Bevirt, 865 Brisa Del Mar, Santa Cruz, CA (US) 95060; David Eliot Scheinman, 15 Roan Pl., Woodside, CA (US) 94062; Fred Italo Polito, 405 Centennial St., Santa Cruz, CA (US) 95062

( * ) Notice: Subject to any disclaimer, the term of this patent is extended or adjusted under 35 U.S.C. 154(b) by 68 days.

(21) Appl. No.: 12/077,057

(22) Filed: Mar. 14, 2008

(65) Prior Publication Data

US 2009/0095863 A1 Apr. 16, 2009

(51) Int. Cl.
*F16M 11/00* (2006.01)

(52) U.S. Cl. ....................................... 248/127; 248/160

(58) Field of Classification Search ................. 248/104, 248/149, 160, 124, 159, 176.1, 694; 381/363
See application file for complete search history.

(56) References Cited

U.S. PATENT DOCUMENTS

| | | | | |
|---|---|---|---|---|
| 5,823,486 | A * | 10/1998 | Smith et al. | 248/104 |
| 6,250,592 | B1 * | 6/2001 | Davis | 248/104 |
| 6,454,226 | B2 * | 9/2002 | Epping et al. | 248/160 |
| 7,481,404 | B2 * | 1/2009 | Carnevali | 248/160 |
| 2001/0038060 | A1 * | 11/2001 | Epping et al. | 248/160 |
| 2004/0052396 | A1 * | 3/2004 | Kuo | 381/363 |
| 2004/0233623 | A1 * | 11/2004 | Hillman et al. | 361/683 |
| 2005/0098875 | A1 * | 5/2005 | Kikuchi et al. | 257/700 |

* cited by examiner

*Primary Examiner*—Ramon O Ramirez
(74) *Attorney, Agent, or Firm*—Michael A. Guth

(57) ABSTRACT

A support arm which utilizes a material with material properties such that the support arm may be easily placed into a position within a range, yet at the edges of this range have elastic properties.

22 Claims, 7 Drawing Sheets

SUPPORT ARM WITH REVERSED ELASTIC AND INELASTIC RANGES

BACKGROUND

1. Field of the Invention

This invention relates to a support arm, and more specifically to a support arm of material with an intermediate inelastic deflection area.

2. Description of Related Art

SUMMARY

A support arm which utilizes a material with material properties such that the support arm may be easily placed into a position within a range, yet at the edges of this range have elastic properties.

DETAILED DESCRIPTION

Figure 1:
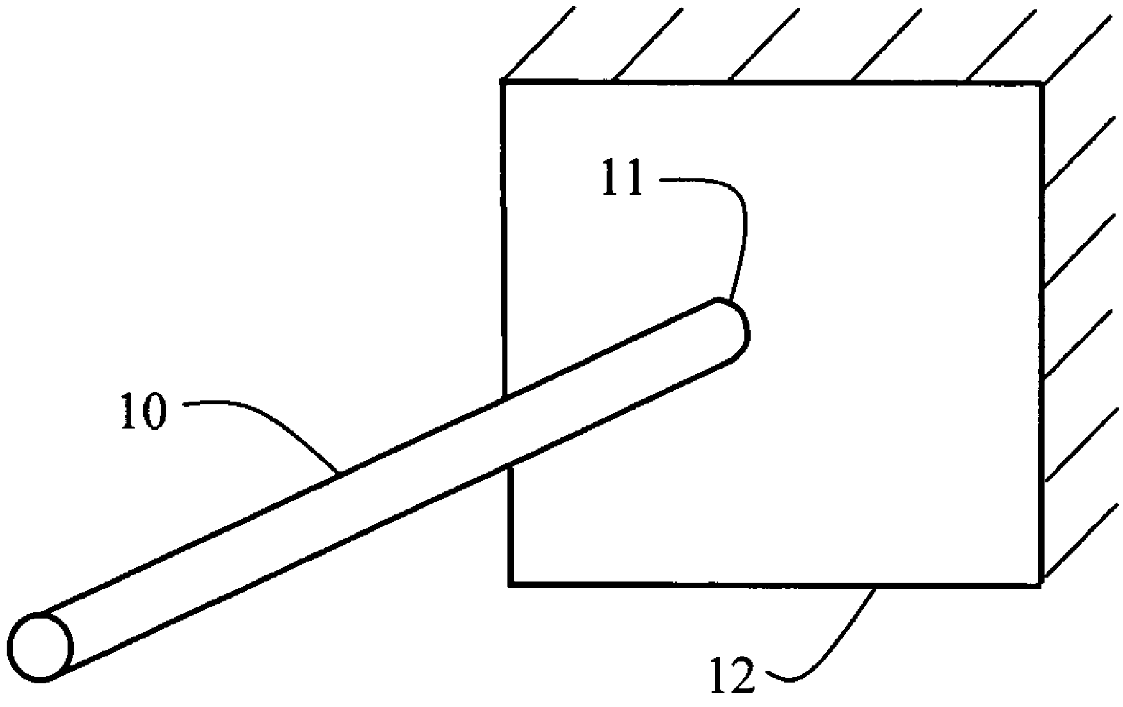
FIG. 1 is sketch of a support arm according to some embodiments of the present invention.

FIG. 1 illustrates a structural member, or support arm, 10, according to some embodiments of the present invention. The support arm 10 is seen attached to a support 12 at an attach point 11. The support arm may be a hollow cylinder in some embodiments. The support arm may be a solid rod in some embodiments. The support arm may be a square tube, or other cross section, in some embodiments.

Figure 2:
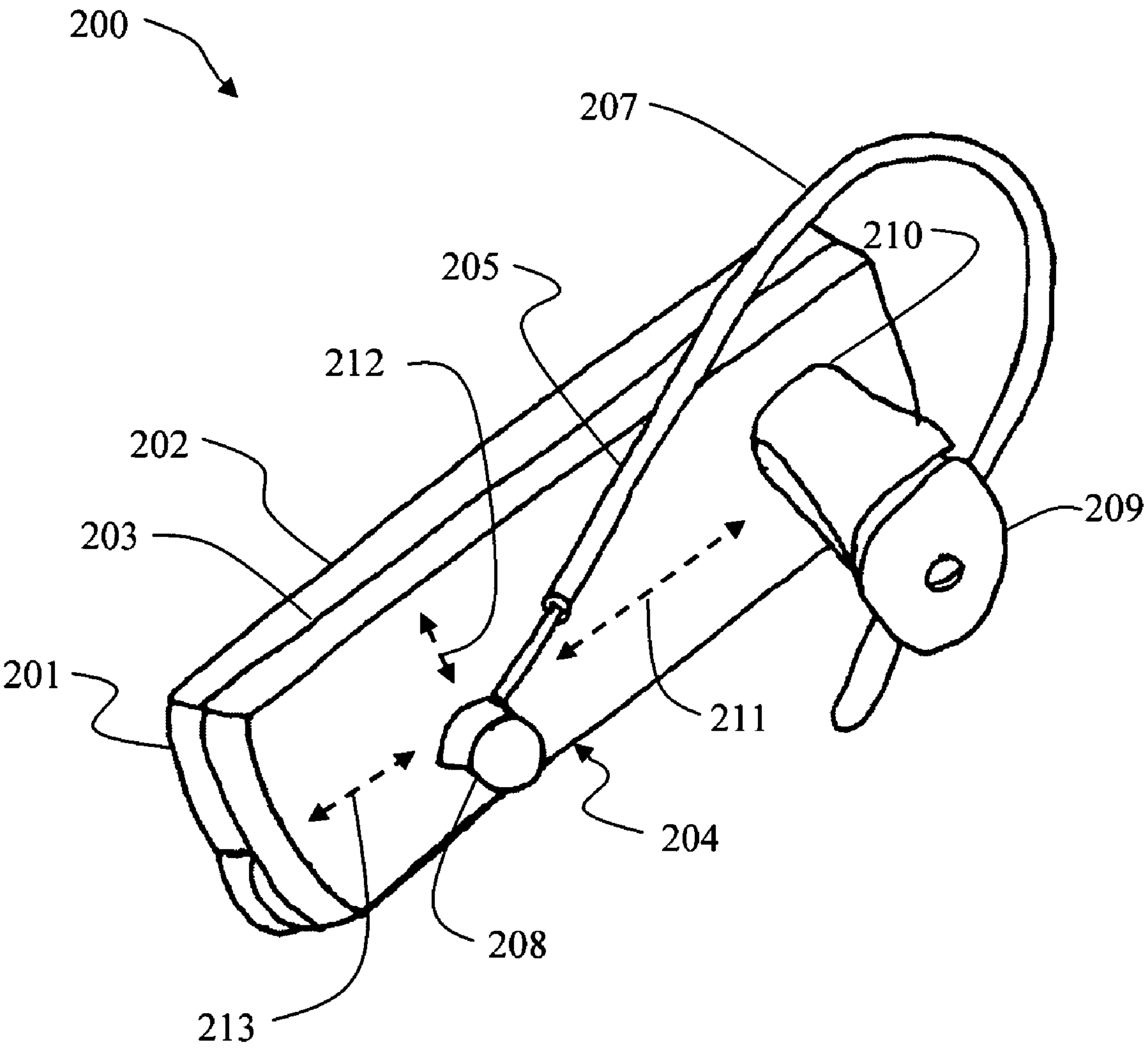
FIG. 2 is a sketch of a support arm illustrating inelastic and elastic ranges according to some embodiments of the present invention.

The support has been manufactured to allow for some particularly useful properties. To allow for further adaptability of the use of the support arm, including geometry and preferences of a user, the support arm may be easily positioned within a central range. As seen if FIG. 2, the central range 13 may have a limit 14. Within the central range 13, the support arm may be easily pushed into a position desired by the user, and it will stay in that position. The support arm exhibits inelastic behavior within the central range. Thus, an individual user may set the support to a position that the user finds comfortable or otherwise appropriate for use. When the support arm is pushed past the limits 14 of the central range 13, into the areas 15 outside the central range 13, the boom will have elastic properties. The boom may pushed far outside the central range 13 and will spring back to the limit area of the central range.

Figure 3:
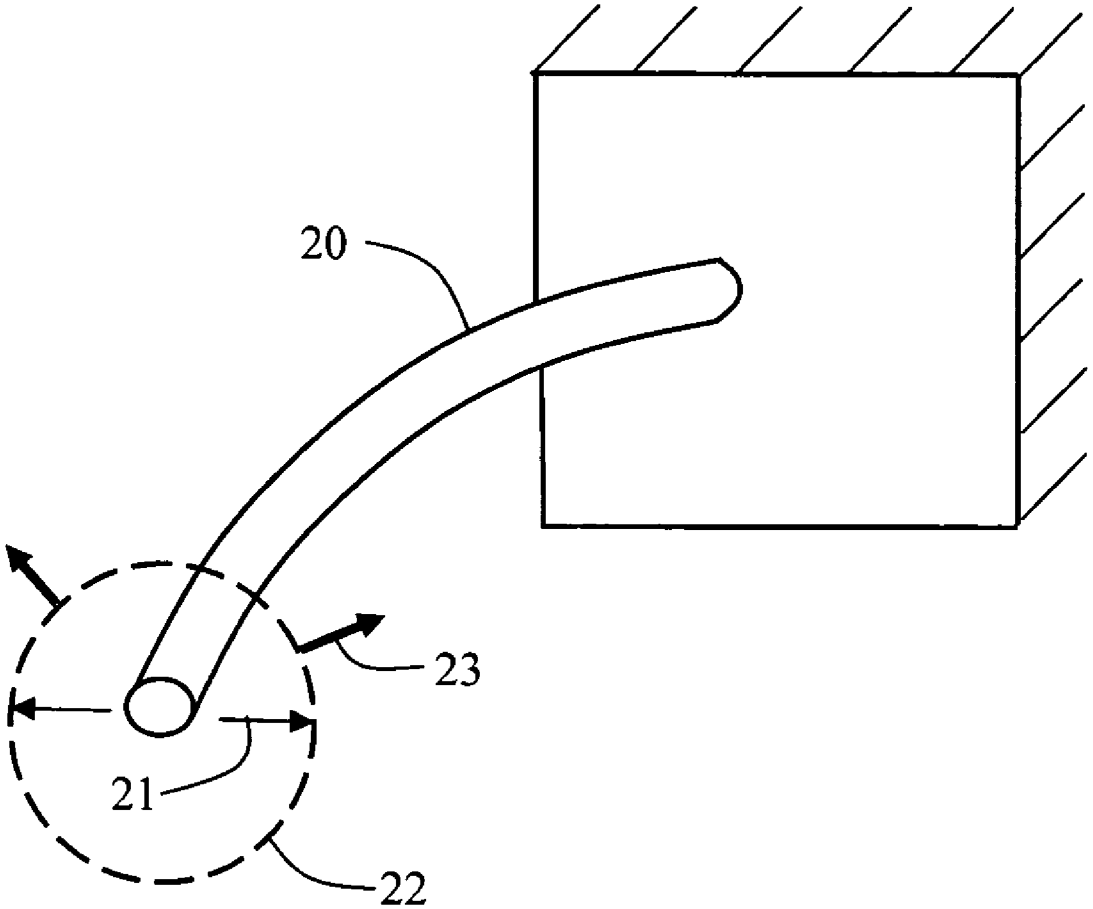
FIG. 3 is a sketch of a support arm illustrating inelastic and elastic ranges according to some embodiments of the present invention.

In some embodiments of the present invention, as seen in FIG. 3, the support arm 20 is more curved. Within the central range 21, the support arm may be easily pushed into a position desired by the user, and it will stay in that position. Thus, an individual user may set the support to a position that the user finds comfortable or otherwise appropriate for use. When the support arm is pushed past the limits 22 of the central range 21, into the areas 23 outside the central range 21, the boom will have elastic properties. The boom may pushed far outside the central range 21 and will spring back to the limit area of the central range.

An exemplary embodiment of the boom is as follows. The first section has an outside diameter of 1.40-1.44 mm, a wall thickness of 0.07-0.12 mm, and a length of 48 mm. The second section has an outside diameter of 1.08-1.12 mm, and wall thickness of 0.07-0.12 mm, and a length of 47.5 mm. The material is a NiTi material starting with an ingot of binary NiTi alloy produced by smelting Sponge Ti and electrolytic Ni. The ingot is forged into a 35 mm diameter rod, rolled into a thin 8 mm diameter NiTi rod, a hole is then put into the rod to form a tube, and then the tube is drawn into the tubing of the desired geometry over several steps. The initial treatment is the same as would be used to set the bend in the booms above. The tubing is placed in a form, which holds it in a curved position, and treated. The initial treatment is a heat treatment of about 480-580C for 10-30 minutes. This initial treatment sets the bend of the aforementioned booms. A further treatment is used to create the central region of inelastic deformation around the set bent shape. The material is then heat treated at 300-550 deg C. for 30 min to 2 hours. After the second treatment, the central region of inelastic deformation will be seen in the material. A typical material will have a central bending range that is elastic, wherein small deflections behave in a spring like fashion. As the material is deflected further, an elastic limit is reached wherein the stress has exceeded the amount under which the material retains its elastic properties. With further deflection, plastic deformation occurs, and the material will not return to its original position upon unloading.

A superelastic material, such as Nitinol (NiTi) may exhibit elasticity over large levels of strain. The increased flexibility obtained in these materials by undergoing large elastic strain can improve their performance. At low levels of stress, the material exits in an austenite phase. Upon further loading, the material undergoes a stress-induced transformation from the austenite phase to a martensite phase. The material behaves as linear elastic in both austenite and martensite phases, however, the modulus of elasticity in the two phases is different. During the stress induced transformation from austenite to martensite there is very little change is stress, but a large increase in strain. Beyond the transitions region in the martensite phase ultimately results in permanent unrecoverable set in the material, while unloading for cases that do not reach the transformation state follow the elastic modulus.

The support arms per embodiments of the present invention behave differently and offer distinct advantages. The central inelastic range allows the user to position the support arm specific to a particular use. For example, the material may be bent at differing radii of curvature at different points along the length of the arm. Also, although the boom is positionable in this central range, the boom will be exceptionally durable for the consumer because the elastic properties outside the central range will greatly lower the likelihood of damage to the boom if it is sat upon or otherwise mistreated by the user. Another advantage of this central range is that is in essence limiting the choices the user may have to “mis-position” the microphone. A user tempted to bend the microphone to a position far from his face will do so only to have it spring back to the outer edge of the central range. This allows the microphone to remain in a range where it is likely to function better, and keeps the microphone out of substantially less optimal positions.

The properties of the support arms with the central range may be due to the setting of the martensite start and the austenite finish temperatures. In many cases, a superelastic material may be set such that the superelastic properties are immediately apparent upon the onset of strain. However, it is possible to set the material properties such that this is not the case, and that some strain must be added before the material moves into its pseudo-elastic, or superelastic, range. This may then allow for inelastic material properties in a central range, and after the addition of enough strain induced stress, such as by moving through this central range, the elastic properties are seen. As the stress during bending is related to the bending section, with material furthest from the bending center seeing the highest stress under bending, the breadth of the central inelastic range may be altered depending upon the selected bending section. For example, a smaller diameter tube will bend further before a certain stress is reached relative to a larger diameter tube. Thus, through manipulation of the bending cross-section one can manipulate the breadth of the central range.

The effects described with regard to the support arms above may be due to having room temperature (or the boom operation temperature) lying between the Ms and Af temperatures.

The inelastic properties in the central range are most probably a result of this being a region where the NiTi alloy is transitioning from austenite to a martensite phase. The highly elastic properties outside the central range are most probably due to an elastic martensite deflection, although the invention is not limited to a single theory.

Figure 4:
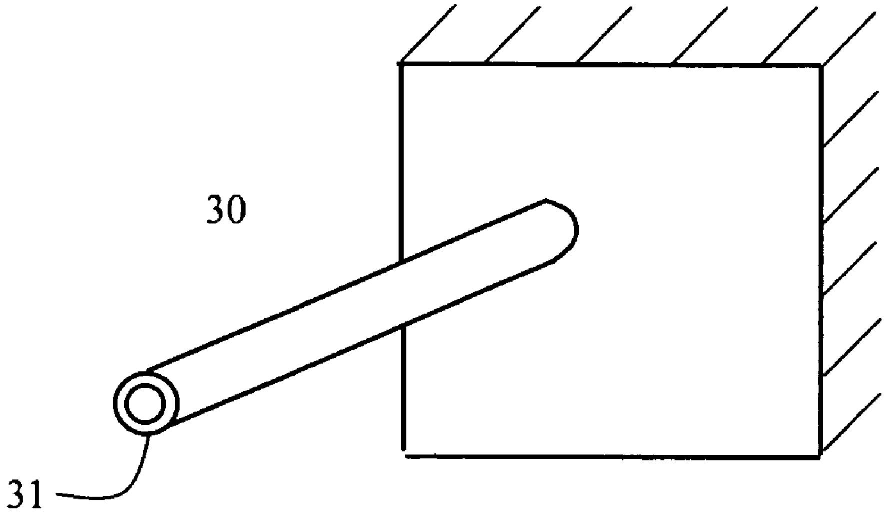
FIG. 4 is a sketch of a support arm of a first stiffness according to some embodiments of the present invention.
Figure 5:
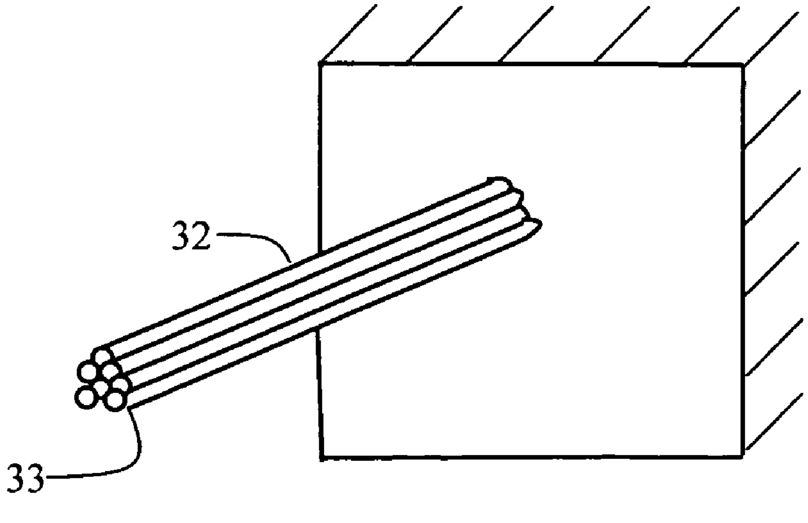
FIG. 5 is sketch of a composite support arm of a first stiffness according to some embodiments of the present invention.

FIGS. 4 and 5 illustrate a design aspect of the present invention. FIG. 4 illustrates a support arm 30 with a cross-section 31. As seen, the cross-section shows that the support arm 30 is a hollow tube. This arm will have a first stiffness within the inelastic central range. FIG. 5 illustrates a composite support arm 32 which is comprised of a plurality of smaller diameter tubes 33. The number of smaller tubes 33 may be set such that the stiffness of the support arm in the central inelastic region is similar to the first support arm 30. However, because of the use of the smaller tubes, the composite arm 32 may be bent further and stay within its central range. Thus, the two support arms may have differing breadths of their central inelastic region. In the larger tube arm 30, more stress is realized by the arm with less bending due to the larger diameter of the tube. The stress buildup then takes the arm out of its inelastic property more quickly with less deflection, in contrast to the bending of a smaller diameter tube. A plurality of smaller tubes may be as stiff as one larger tube, but will allow further deflection before as much stress builds up in the material because of the differing bending sections. Thus, one can design for the breadth of the central range, as well as the stiffness, by trading off the aforementioned factors.

Figure 6:
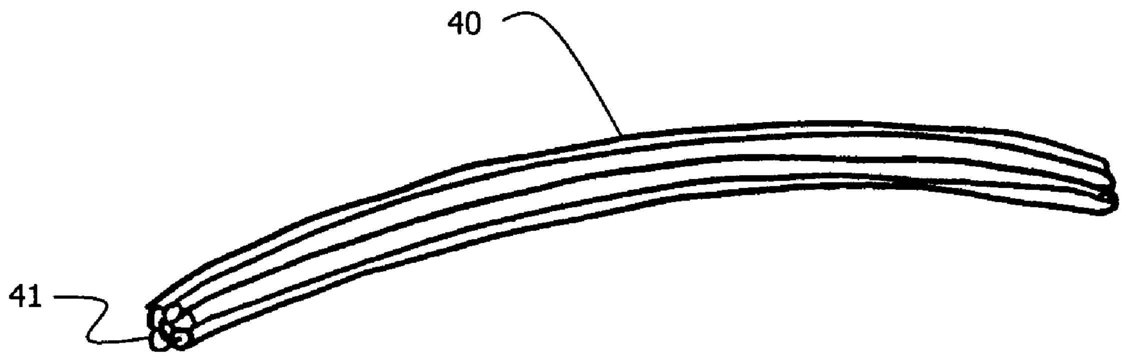
FIG. 6 is a sketch of a composite support arm according to some embodiments of the present invention.

FIG. 6 illustrates a support arm 40 comprised of a plurality of elements 41 according to some embodiments of the present invention. As seen, the arm need not be embedded into a structure at one end.

Figure 7:
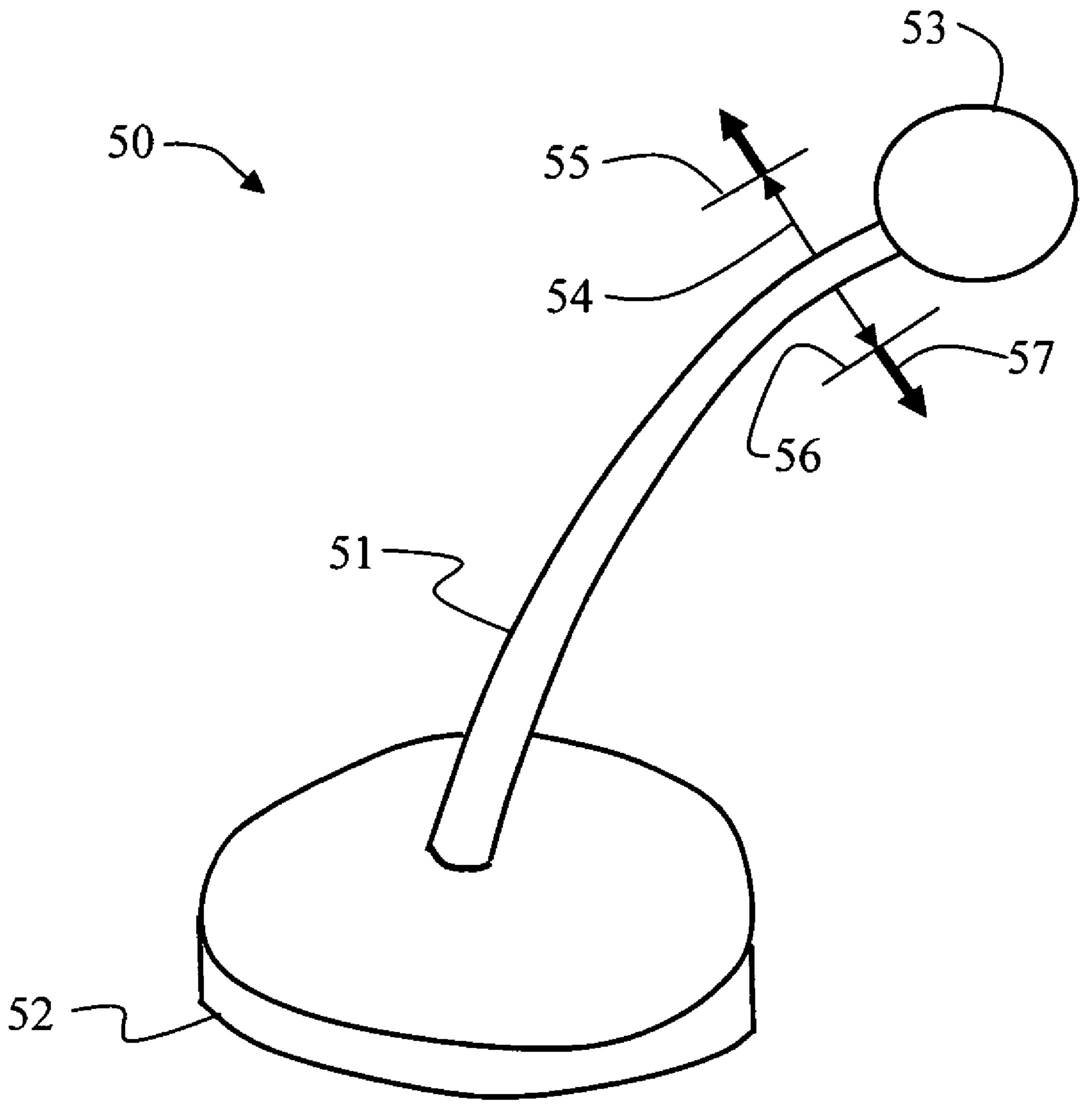
FIG. 7 is a support arm for a microphone stand according to some embodiments of the present invention.

FIG. 7 illustrates a microphone stand 50 according to some embodiments of the present invention. A microphone 53 is seen attached to the far end of the support arm 51. A base 52 supports the arm. Wiring for the microphone may be contained within the boom. A central range 54 is seen illustrating the inelastic central region. Beyond the limits 55, 56 of the central range, an elastic range 57 exists.

Figure 8:
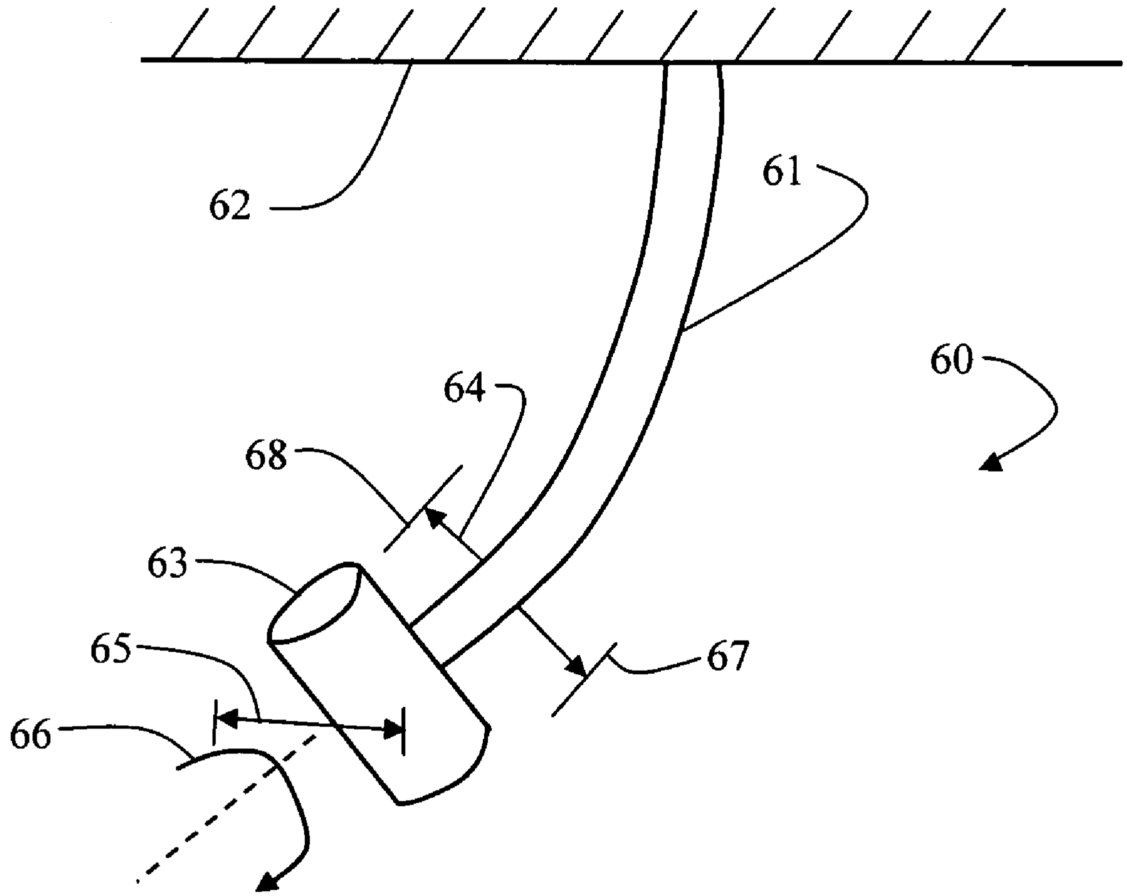
FIG. 8 is a support arm for an overhead light according to some embodiments of the present invention.

FIG. 8 illustrates a structure 60 according to some embodiments of the present invention. The light fixture 63 is seen with support arm 61. The varying central ranges 64, 65, 66 in different axes, including torsion, are illustrated.

We claim:

1. A support arm comprising:

a first end;

a second end; and a main arm section between said first end and said second end, said main arm section having an inelastic central bending range wherein said main arm section has an elastic outer bending range, wherein said elastic outer bending range comprises deflections of said main arm section greater than the deflections of said inelastic central bending range.

2. The support arm of claim 1 wherein said main arm section comprises a shape memory alloy.

3. The support arm of claim 2 wherein said shape memory alloy comprises a NiTi alloy.

4. The support arm of claim 3 wherein the martensite start temperature of the NiTi alloy is below 20 degrees Celsius, and wherein the austenite finish temperature of the NiTi alloy is above 20 degrees Celsius.

5. The support arm of claim 1 wherein said main arm section comprises nitinol.

6. The support arm of claim 5 wherein said main arm section has a tubular cross-section.

7. The support arm of claim 6 wherein said main arm section has a solid cross-section.

8. The support arm of claim 6 wherein said tubular cross-section has a wall thickness in the range of 0.07 mm to 0.12 mm.

9. The support arm of claim 6 wherein said tubular cross-section has an outside diameter in the range of 1.0 mm to 1.5 mm.

10. The support arm of claim 1 wherein said support arm is curved.

11. The support arm assembly of claim 1 comprising a plurality of arm elements, wherein each of said plurality of arm elements have an inelastic central bending range.

12. The support arm assembly of claim 11 wherein each of said plurality of arm elements has an outer elastic bending range, wherein said outer elastic bending range is outside of said inelastic central bending range.

13. The support arm assembly of claim 12 wherein each of said plurality of arm elements comprise a shape memory alloy.

14. The support arm assembly of claim 12 wherein each of said plurality of arm elements comprises a NiTi alloy.

15. The support arm assembly of claim 14 wherein each of said plurality of arm elements has a tubular cross-section.

16. The support arm of claim 14 wherein the martensite start temperature of the NiTi alloy is below 20 degrees Celsius, and wherein the austenite finish temperature of the NiTi alloy is above 20 degrees Celsius.

17. The support arm assembly of claim 14 wherein each of said plurality of arm elements has a solid cross-section.

18. A method for the manufacture of the support arm of claim 1, said method comprising the steps of:

placing said support arm in an initial position;

heat treating said support arm with a first treatment; and heat treating said support arm with a second treatment.

19. The method of claim 18 wherein said support arm is NiTi alloy.

20. The method of claim 19 wherein said initial position is curved.

21. The method of claim 19 wherein said first treatment is a heat treatment of about 280-580 degrees Celsius.

22. The method of claim 21 wherein said second treatment is a heat treatment of about 300-550 degrees Celsius.

* * * * *